US006785472B1

(12) United States Patent
Adams et al.

(10) Patent No.: US 6,785,472 B1
(45) Date of Patent: Aug. 31, 2004

(54) BROADBAND AMPLIFIED WDM RING

(75) Inventors: Laura Ellen Adams, Basking Ridge, NJ (US); Jon Anderson, Brielle, NJ (US); Robert Mario Broberg, San Francisco, CA (US); David John DiGiovanni, Montclair, NJ (US); Karsten Rottwitt, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/334,047

(22) Filed: Jun. 15, 1999

(51) Int. Cl.[7] ........................ H04J 14/02; H04B 10/20
(52) U.S. Cl. .......................................... 398/79; 398/59
(58) Field of Search ........................ 359/119, 134, 359/160, 124, 341.3; 398/79, 92, 59

(56) References Cited

U.S. PATENT DOCUMENTS

| | | | | |
|---|---|---|---|---|
| 5,576,875 A | * | 11/1996 | Chawki et al. | 359/125 |
| 5,598,294 A | * | 1/1997 | Uno et al. | 359/176 |
| 5,854,698 A | * | 12/1998 | Eskildsen et al. | 359/119 |
| 5,872,650 A | * | 2/1999 | Lee et al. | 359/337.13 |
| 6,356,383 B1 | * | 3/2002 | Cornwell et al. | 359/334 |

FOREIGN PATENT DOCUMENTS

| | | | | |
|---|---|---|---|---|
| EP | 0903876 | 3/1999 | | H04B/10/17 |
| GB | 2289978 | 12/1995 | | H01S/3/06 |
| WO | WO9739547 | 10/1997 | | H04J/14/02 |

OTHER PUBLICATIONS

A. Stentz et al., "Raman Amplifier with Improved System Performance", OFC '96, IEEE, 1996.*
Hansen, P. "Remote optical amplification extends transmission spans," Laser Focus World, (1998).
Masuda, H. et al., "Ultra–wideband Optical Amplification with a 3–dB Bandwidth of 67 nm using a partially Gain–Flattened Erbium–doped Fiber Amplifier and Raman Amplification", Proceedings of OAA Conference (1997).
Nissov, M. et al., "100 Gb/s (10x10Gb/s) WDM Transmission over 7200 km Using Distributed Raman Amplification," ECOC Proceedings, (1997).
Rottwitt, K. et al., "A 92 nm Bandwidth Raman Amplifier," Proceedings of OFC (1998).
Hansen, P.B. et al., "Dense wavelength–division multiplexed transmission in 'zero–dispersion' DSF by means of hybrid Raman/erbium–doped fiber amplifiers," Proceedings of OFC, (1999).
U.S. patent application Ser. No. 09/333,406, filed on Jun. 15, 1999.

* cited by examiner

Primary Examiner—Jason Chan
Assistant Examiner—Shi K. Li
(74) Attorney, Agent, or Firm—Martin I. Finston

(57) ABSTRACT

A fiber-optic WDM ring carries communication traffic among a plurality of nodes, each node associated with respective subscriber premises. Remote gain is provided in at least one link of the ring. In specific embodiments of the invention, the remote gain is applied preferentially to those wavelength channels most in need of amplification. In specific embodiments of the invention, the remote gain is Raman gain.

5 Claims, 3 Drawing Sheets

BROADBAND AMPLIFIED WDM RING

FIELD OF THE INVENTION

The present invention relates generally to optical networking, and, more particularly, to installations in which a WDM ring carries short-haul communications.

BACKGROUND OF THE INVENTION

There is currently a market need, experienced by, for example, telephone carriers and cable operators, to provide short-haul transmission of internet protocol (IP) packets among interconnected nodes that are typically spaced apart by about 20 km or less. Proposed systems use an IP packet over SONET interface, and use wavelength-division multiplexing (WDM) to carry the packets on an optical fiber transmission medium.

One particular class of architectures for the short-haul network is the class of ring architectures. Such architectures are especially useful for serving business parks, campuses, military bases, networks of geographically dispersed company buildings, and the like. Typically, a pair of counter-propagating fiber-optic rings connects a plurality of nodes, disposed along the ring, with a hub. The hub manages inbound and outbound transmissions between the ring and external communication networks. Each node typically serves one subscriber or aggregate of subscribers, which by way of illustration could be an office suite in an urban office building.

One drawback of optical ring networks is that the optical signal loss accrues over the network. Loss contributions include distributed loss due to attenuation in the optical fiber links that extend between adjacent nodes, and they also include discrete losses associated with the optical add-drop elements at the respective nodes.

Because these losses accrue over the network, such a network has a limited potential for growth. That is, even modest fractional increases in the total fiber length or the total number of nodes may carry an unacceptable loss penalty.

Conventionally, such a problem might be solved by providing amplification at each node. However, such a solution adds a substantial installation cost to the network. Since low cost is often one of the attractions of an optical ring network, this solution is likely to be unacceptable.

Therefore, there is a particular need for an optical ring network that can be expanded while maintaining relatively low overall cost.

SUMMARY OF THE INVENTION

We have developed a dual-ring, bi-directional optical fiber transmission system that interconnects a plurality of nodes with a hub, such that multiple WDM channels are established on each ring.

Although the invention is not so limited, this system is particularly useful when a relatively wide spacing of the channels, exemplary a spacing on the order of 10–30 nm, and more typically about 20 nm, enables the use of very low cost transceivers and avoids the need for temperature control. Such a WDM system is often referred to as a coarse WDM (C-WDM) system.

At each node, an optical add-drop module (OADM) operates to (a) extract, for the purposes of a receiver, or (b) insert, for the purposes of a transmitter, information in one or more of the channels.

We have found that accrued losses in this, and other, optical WDM networks can be offset in a cost-effective manner by distributed gain that is applied preferentially to those wavelength channels most in need of amplification. This helps to pave the way for network expansion while maintaining relatively low overall cost.

Accordingly, the invention involves an optical communication network that includes at least one unidirectional WDM ring that interconnects a hub and a plurality of nodes. A distinct wavelength channel is assigned to each node for communication along the ring from the hub to such node and from such node to the hub. Each adjacent pair of nodes is connected by a link of the WDM ring. The hub is likewise connected by a link to each of its adjoining nodes. At least one link, which is herein denominated a "pumped" link, is optically coupled to a pump source. This coupling is direct, in the sense that it does not take place through the intermediacy of any intervening link. The aforesaid optical coupling of a pump source to a pumped link is arranged to optically amplify signals that pass through the pumped link.

Various arrangements of the pumped link or pumped links fall within the scope of the invention. In some embodiments of the invention, such arrangement has the property that: (i) signals that lie in a first wavelength channel and are associated with a first node will experience some optical gain when following a complete path, including at least one pumped link, between the hub and the associated node; and (ii) there will be signals lying in at least one further wavelength channel and associated with a further node that experience a different optical gain when following a complete path, including at least one pumped link, between the hub and the further node.

In alternate embodiments of the invention, there is at least one pumped link that imparts gain to signals in a first wavelength channel, and that imparts a different amount of gain to signals in a distinct, second wavelength channel.

In other embodiments of the invention, at least one pump source is a Raman pump source, arranged such that at least one wavelength channel is subject to Raman amplification in the corresponding pumped link.

In yet other, more specific embodiments of the invention, at least one pump source is a Raman pump source, arranged such that at least one wavelength channel will experience Raman gain in the corresponding pumped link, but also such that said gain is not experienced equally in all of the wavelength channels.

DETAILED DESCRIPTION

Figure 1:
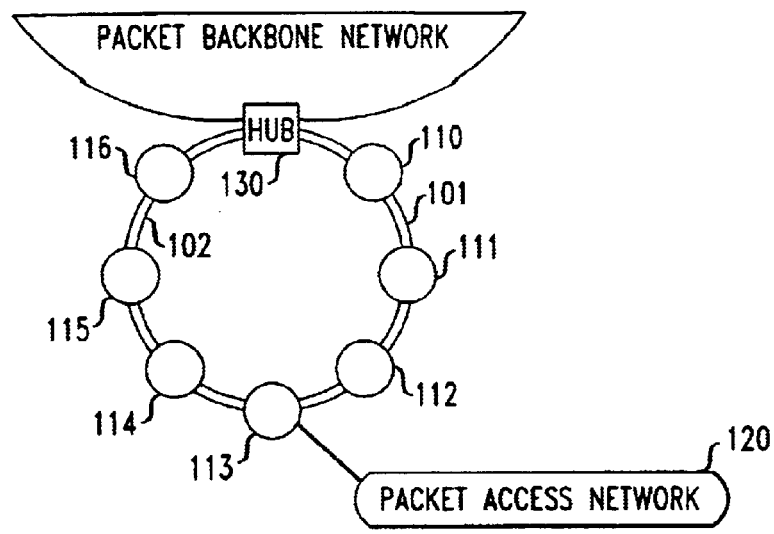
FIG. 1 is a block diagram of a dual-ring, bi-directional fiber-optic transmission system arranged to interconnect a plurality of nodes with a hub.

An illustrative network is now described in greater detail with reference to FIG. 1.

A dual-ring, bidirectional optical fiber transmission system interconnects a series of nodes, e.g., nodes 110–116, with a hub 130, such that multiple, widely spaced coarse WDM channels are established on the respective unidirectional rings 101, 102. Typically, a relatively wide spacing of the channels, on the order of 20 nm, enables the use of inexpensive transceivers and avoids the need to control the temperature of transceiver components such as semiconductor lasers. At each node, there is an optical add-drop module (OADM) arranged to (a) extract, for the purposes of a receiver, or (b) insert, for the purposes of a transmitter, information in one or more of the channels.

Figure 3:
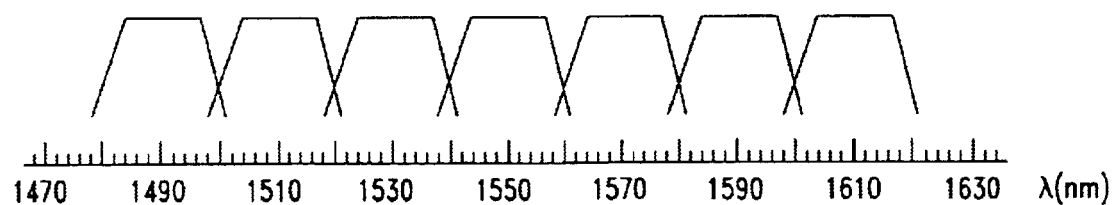
FIG. 3 is a diagram that schematically illustrates an exemplary set of coarse WDM channels useful in the operation of an optical WDM ring network.

A channel passband of 13 nm with a channel spacing of 20 nm is typical. An exemplary range of channel passbands useful in this context is 5–20 nm. FIG. 3 shows an illustrative set of seven channels, each 13 nm wide, and having a channel spacing of 20 nm. As will be seen from the figure, the illustrative channels have respective passbands centered at a grid of wavelengths lying approximately in the range 1490–1610 nm.

The signals in the one or more channels are coupled to the OADMs in each node by a standard optical transceiver, which performs modulation and demodulation. The transceiver, in turn, is coupled to a packet framer, which supplies received IP packets to, and receives outgoing IP packets from, a conventional Layer 3 routing engine.

Hub 130 is connected to a managed IP backbone network 140. The transmission system of FIG. 1 is effective to route IP packets, typically using the SONET interface and protocol, from backbone network 140 to destinations that are interconnected to the system via other access networks, such as the IP access network 120 shown coupled to node 113, and vice versa (i.e., from users connected to access network 120 to backbone network 140). IP access network 120 may be a PathStar IP switch available from Lucent Technologies Inc. of Murray Hill, N.J.

Figure 2:
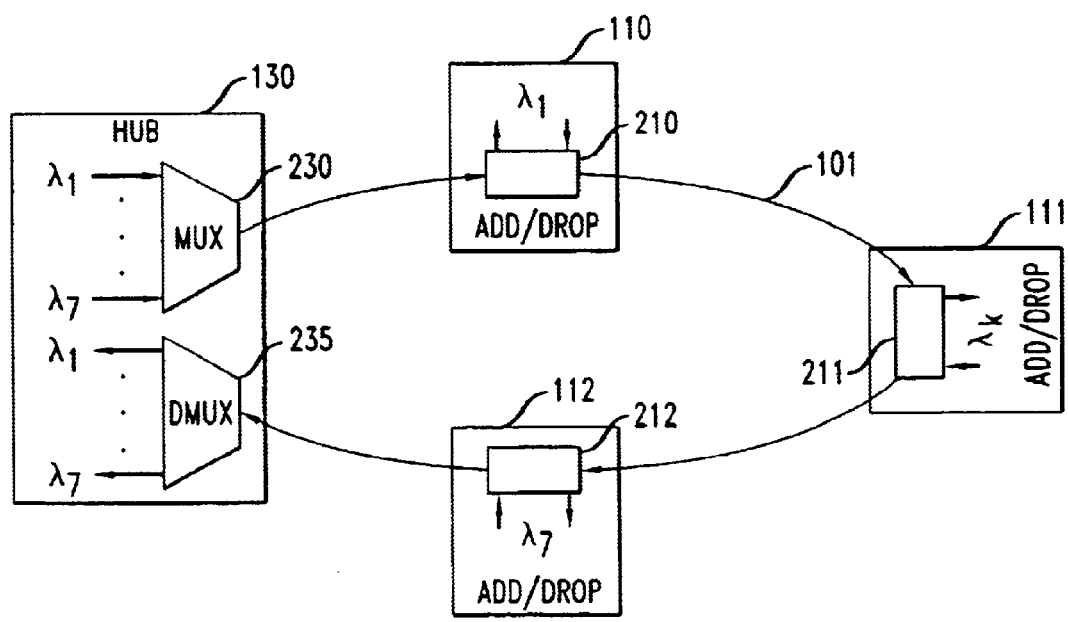
FIG. 2 is a block diagram showing one of the optical transmission rings of FIG. 1, including expanded detail of the hub and some of the nodes.

Turning now to FIG. 2, ring 101 is shown interconnecting nodes 110–112 with hub 130. Ring 101 is shown as transmitting packets from node to node in the clockwise direction. Each of the nodes 110–112 includes a respective OADM 210–212, arranged to (a) extract from the wavelength division multiplexed signals present on ring 101, only those signals in a specific wavelength band, corresponding to a widely spaced WDM channel, and (b) insert signals back onto ring 101 in the same specific wavelength band and WDM channel. Thus, as seen in FIG. 2, OADM filter 210 in node 110 is tuned to wavelength $\lambda_1$, OADM filter 211 in node 111 is tuned to wavelength $\lambda_k$, and OADM filter 212 in node 112 is tuned to wavelength $\lambda_7$, it being assumed in this example that there are a total of seven WDM channels available on ring 101.

In hub 130, incoming information packets are applied to ring 101 via multiplexer 230, and outgoing information packets are extracted from ring 101 via demultiplexer 235. Multiplexer 230 and demultiplexer 235 are connected to the originating and terminating ends, respectively, of ring 101. These elements may, e.g., be part of a PacketStar W-WDM LiRIC available from Lucent Technologies, Inc. In the embodiment illustrated, multiplexer 230 receives packets carried in seven separate input streams, each stream representing an individual WDM channel $\lambda_1$ to $\lambda_7$. The individual inputs are combined into a single WDM signal and applied to ring 101. Similarly, demultiplexer 235 receives the WDM signal on ring 101, separates the combined signal into seven separate output streams, and applies the output streams to suitable decoding apparatus.

Further details of the exemplary ring network can be found in the copending application of L. Adams, J. Anderson, W. Brinkman and R. Broberg, filed on Jun. 15, 1999 under the title "Wideband Optical Packet Ring Network", and assigned to the same assignee as the present invention.

While the preceding description of an embodiment of the present invention relates to an Internet Protocol (IP) network carrying IP packets, it is to be understood that the present invention can be used in connection with many diverse types of networks and with the transmission of different types of information bearing packets or signals. Thus, as used herein, the term "packets" includes, but is not limited to, data packets (such as are used in asynchronous transfer mode (ATM), synchronous transfer mode (STM), and/or internet protocol (IP) networks), as well as other information bearing signals, sometimes referred to as "frames", that are found, for example, in streaming audio and/or video applications.

Figure 4:
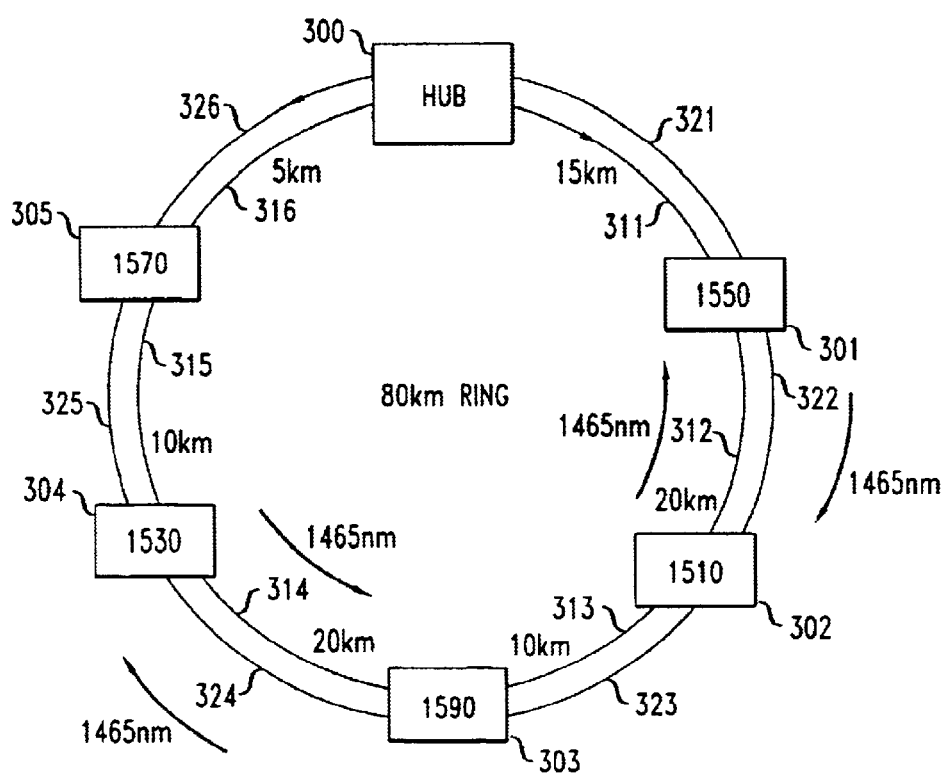
FIG. 4 is a simplified diagram of a WDM ring network having two pumped links in accordance with an exemplary embodiment of the invention.

Reference is now made to the simplified WDM ring network of FIG. 4. This network comprises hub 300 and nodes 301–305. The network further comprises clockwise links 311–316, which together with the hub and nodes define a clockwise ring, and counterclockwise links 321–326, which together with the hub and nodes define a counterclockwise ring. Lengths of the respective links are indicated on the figure, it being supposed that the total length of all of the links (in a given direction) is 80 km. It will be appreciated that node 303 is the node nearest the center of the network, in the sense that for node 303, the accumulated losses from the hub to the node most closely approximate the accumulated losses from the node to the hub, continuing around the ring in the same direction. It should be noted in this regard that losses associated with each node are typically 1–3 dB, and losses in typical communication fibers for broadband WDM applications are typically about 0.3 dB per kilometer.

Node 303 faces a preponderant amount of loss on neither side, and therefore, at least if it occupies a ring of modest size, does not require amplification in its associated wavelength channel. In this regard, a ring of modest size may be regarded as one having ten or fewer nodes, and a total length of 100 km or less.

Node 301, on the other hand, faces a strongly preponderant amount of loss on the clockwise node-to-hub path, and on the counterclockwise hub-to-node path. Conversely, node 305 faces a strongly preponderant amount of loss on the clockwise hub-to-node path and on the counterclockwise node-to-hub path. Thus, it is advantageous to provide amplification, on the respective lossy paths, of signals in the respective channels associated with nodes 301 and 305. By preferentially providing amplification at the places and in the wavelength channel where it is most needed, it is possible to economize while maintaining flexibility for future growth.

One exemplary scheme for amplifying the channels associated with nodes 301 and 305 is illustrated in FIG. 4. As shown there, pump energy for, e.g., Raman amplification is injected into links 312 and 322, and into links 314 and 324.

As is well known in the art, Raman pump energy is readily provided from, e.g., a 150-mW laser diode coupled into the ring by a wavelength-dependent coupler, such that the pump energy propagates counter to the traffic in the pumped link. Loss associated with the wavelength-dependent coupler is generally less than 1 dB, and typically about 0.5 dB. The pump laser and wavelength-dependent coupler are typically housed at the node at the endpoint of the pumped node which is downstream with respect to traffic flow.

Examining first the clockwise ring, it is seen that node-to-hub traffic from node 301 passes through two pumped links, and hub-to-node traffic to node 305 also passes through two pumped links. Conversely, in the counterclockwise ring, hub-to-node traffic to node 301 and node-to-hub traffic from node 305 each pass through two pumped links.

Raman pumping is particularly useful in WDM networks because Raman pumping provides gain over a relatively wide range of wavelengths. When Raman gain in the typical communication regime near 1550 nm is plotted as a function of wavelength, the resulting gain curve has a width, very roughly, of 120 nm, and a peak wavelength that is roughly 100 nm greater than the pump wavelength. Thus, it will often be the case that each Raman pump laser can provide a significant amount of gain to several channels at once.

However, Raman amplification using a given pump will not, in general, be equally effective over all of the wavelength channels being used. This is particularly so when the channels have a relatively high separation, such as the exemplary separation of 20 nm.

Figure 5:
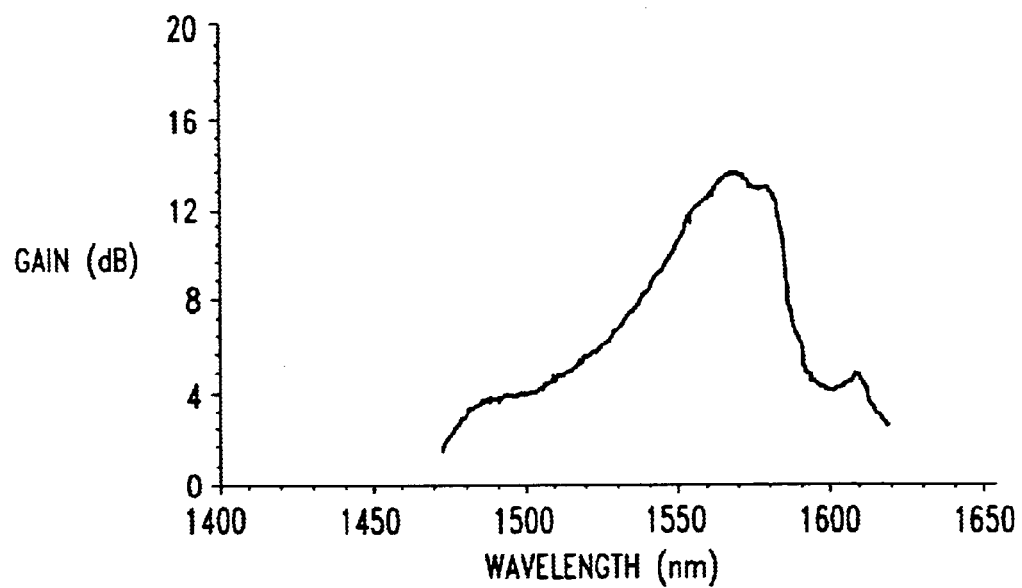
FIG. 5 is a gain curve of an illustrative Raman amplifier pumped at a wavelength of 1465 nm. This gain curve was calculated assuming a 300 mW pump emits into a 20-km span of optical fiber. Examples of suitable fiber for a gain medium are AllWave™, TruWave®, and DSF fiber, all commercially available from Lucent Technologies, 600 Mountain Avenue, Murray Hill, N.J.

For example, each of the rings illustrated in FIG. 4 has two pumps. On each ring, each of these pumps is selected to emit pump radiation at 1465 nm. Both the 1550-nm channel and the 1570-nm channel lie near the center of the corresponding gain curve, which is shown in FIG. 5. Accordingly, appropriate wavelength assignments for the associated with nodes 301 and 305 are 1550 nm and 1570 nm respectively, as indicated in FIG. 4. Each of these channels will experience a substantial amount of gain. On the other hand, the other exemplary channels all experience gain that is more than 5 dB below the peak of the gain curve.

Although some Raman pump radiation will pass through the node at the upstream end of the pumped link and thus provide some gain in the next link, such gain will be relatively small due to attenuation of the pump radiation. Thus, to a good approximation, Raman amplification can generally be neglected in all but the pumped link or links.

It will be seen from FIG. 4 that the amplified signals to or from node 301 and to or from node 305 pass through two pumped links (in each ring), and thus experience double amplification, i.e., amplification from each of two pumps which may, e.g., each be a 150-mW pump. In the arrangement shown, the same is true of "lossier-side" signals associated with each of the nodes except for nodes 302 and 303.

However, the strategy of using two pumped links, instead of just one, has the result that the lossier-side traffic associated with nodes 302 and 303 still passes through one pumped link. By contrast, suppose that in, e.g., the clockwise ring only ling 314 were pumped. In that case, traffic on the lossier side of node 303 would not pass through any pumped link. Thus, pumping two links has the effect that some advantageous Raman gain is provided to traffic associated with every node, provided, of course, that the corresponding wavelength channel lies within a portion of the spectrum where the gain curve has an appreciable amplitude.

In fact, the presence of two pumped links as shown has the effect that traffic on both sides of nodes 302 and 303 experience some gain. This is particularly advantageous in relatively long networks, in which the most medial nodes are relatively distant from the hub.

When two pump lasers are used together to pump the same link, they are typically joined by a polarization multiplexer. When the pumps are separated as described above, a polarization multiplexer is not needed. Thus, a further advantage of separating the pumps is that the cost of a polarization multiplexer is saved.

As noted, out of the five nodes illustrated, the two having the most preponderant lossy sides are assigned the wavelength channels nearest the peak of the gain curve. These are the 1570-nm and 1550-nm channels. Inspection of FIG. 4 shows that the next most needy node is node 304, and therefore it is assigned the most central, relative to the gain peak, of the remaining channels. This is the 1530-nm channel. The two remaining channels are assigned to the two most central nodes, namely nodes 302 and 303. These channels are the 1510-nm and 1590-nm channels, respectively.

One significant characteristic of the network of FIG. 4 is that traffic in every channel passes through at least one pumped link, but different channels experience different amounts of gain. In fact, different channels experience different gains not only within a given pumped link, but also along respective hub-to-node or node-to-hub paths, each containing a pumped link. Thus, this approach is quite different from an approach in which an essentially uniform amount of gain is applied across all channels. Such a flat-gain approach might be implemented, e.g., by providing an individually optimized pump for each respective channel.

Those skilled in the art will appreciate that there is considerable flexibility in the designation of pumped links and the assignment of wavelength channels to nodes. In any given network, it is advantageous to make such designations and such assignments in a manner that optimizes the received signals while honoring constraints, such as imposed cost constraints, that limit the total number of pumps. One exemplary approach to such optimization is described below.

It should be noted that although Raman amplification is advantageous because of its broad gain curve, other distributed gain mechanisms can be employed in the context of the present invention. Such mechanisms include, for example, distributed gain in rare-earth doped fibers, such as erbium-doped fibers. Moreover, discrete optical amplifiers can be employed at selected nodes or, indeed, at all of the nodes.

It should also be noted that whereas the network of FIG. 4 employs two Raman pumps emitting at the same wavelength, it will be advantageous in at least some networks to employ two or more Raman pumps emitting at different wavelengths. By pumping at more than one wavelength, it is possible to extend relatively high Raman gain to a greater span of wavelength channels. Moreover, as the network expands by the addition of nodes, further Raman pumps are readily added, as required, emitting at existing pump wavelengths or at new pump wavelengths.

It should further be noted that a conventional Raman pump for a communication network generally consists of a pair of pump diodes that are polarization-multiplexed in order to pump the gain medium uniformly with respect to polarization. This helps to suppress noise effects that could otherwise be generated due to the polarization-sensitivity of the Raman gain mechanism. However, polarization multiplexing incurs a small but significant loss penalty due to the multiplexing optical component, and it also reduces the designer's flexibility regarding the placement of individual pump sources. Fortunately, there will be many WDM ring networks, particularly those handling IP traffic at a maximum data rate of about 2.5 Gbit per second, that can tolerate some polarization-related noise. In such systems, it will often be advantageous, for flexibility and cost savings, to install Raman pumps individually and not in multiplexed pairs.

Figure 6:
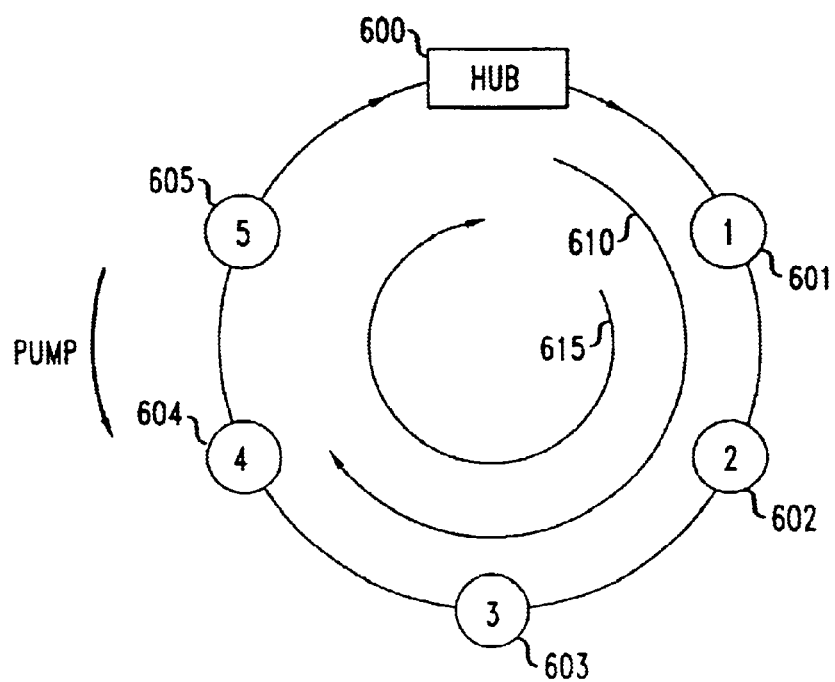
FIG. 6 is a simplified diagram of one unidirectional ring of a bidirectional WDM ring network.

An exemplary design procedure is now described with reference to FIG. 6. FIG. 6 shows only one of the two unidirectional rings of FIG. 4, illustratively the clockwise ring. Connected along the ring are hub 600 and nodes 601–605.

Associated with each hub-to-node and node-to-hub path is a loss accounting that includes optical fiber losses and discrete losses due to optical components at nodes. Each node has a loss score, which is the value of the loss accounting for that side of the node, i.e., for the hub-to-node path or the node-to-hub path, that has the greater loss accounting. Thus, for example, the loss score for node 604 is based on path 610, and the loss score for node 601 is based on path 615.

There are one or more Raman pumps, each associated with a particular node which lies at the downstream end of the corresponding pumped link. The pump location or locations are initially assumed to be given a priori.

In addition to the loss score, each node also has a gain score. The gain score is computed with reference to the same path that served as the basis for the loss score. The gain score is the total gain, e.g. the total Raman gain, experienced by traffic in that path, under a given set of wavelength assignments for the nodes and the Raman pumps. In the of FIG. 6, it will be seen that path 615 passes through a pumped link, but the gain score for path 610 will be near zero because this path does not pass through a pumped link.

In accordance with one design procedure, the nodes are classified into at least three groups, with at least one node in each group. The nodes having the highest loss scores go into one group, those with intermediate loss scores go into a second group, and those with the lowest loss scores go into a third group. For example, in the network of FIG. 6, the first group might consist of nodes 601 and 605, the second of nodes 602 and 604, and the third of node 603. The boundaries between these groups may be flexible, however, so that a node at the top of one group might be moved into the bottom of the next group, and vice versa.

Wavelengths are assigned to the nodes in such a way that the group having the highest loss scores gets the highest gain scores, and so on. Optionally, strict ordering of gain scores can be required within a group, such that the node with the highest loss score gets the highest gain score, etc. However, for greater flexibility, it will often be desirable to dispense with such a requirement.

Well known techniques are readily applied in order to optimize some figure of merit for the wavelength assignments. In one example, the gain scores of one or more designated nodes are optimized. In another example, some overall gain uniformity is achieved by minimizing, over all of the nodes, the sum of the respective loss and gain scores (treating the gain scores as positive and the loss scores as negative). If overall gain uniformity is the goal, it may be desirable to take into account both the node-to-hub path and the hub-to-node path associated with each node.

Of course, each optimization can be repeated over each of various pump configurations in order to optimize over pump configurations as well.

A highly simplified, but useful, procedure is now described for assigning wavelength channels to nodes. The placement of the Raman pump or pumps, and the corresponding pump wavelength or wavelengths, are assumed to be given a priori. The nodes are listed in a column of a table in descending order according to loss score. Next to each node, the gain score is listed in a separate column for each possible wavelength channel that might be assigned to that node. On the first line of the table, assign the wavelength giving the highest gain score, and remove that wavelength from further consideration. On each succeeding line, assign that one of the remaining wavelengths that gives the highest gain score, and remove that wavelength from further consideration. After the last wavelength assignment has been made, break the column of nodes into a top portion, a middle portion, and a bottom portion. Within each portion, wavelengths can be reassigned.

What is claimed is:

1. An optical communication network comprising at least one unidirectional wavelength-division multiplexed (WDM) ring that interconnects a hub and a plurality of nodes, wherein:
    a) a distinct wavelength channel is assigned to each node for communication on a path along the ring from the hub to such node and on a path along the ring from such node to the hub;
    b) each adjacent pair of nodes, and likewise each pair consisting of the hub and an adjacent node, is connected by a link of the WDM ring;
    c) at least two links, to be referred to as pumped links, are optically coupled to pump sources, such that said coupling takes place directly to a pumped link, rather than through the intermediacy of some other link;
    d) the optical coupling of pump sources to pumped links is arranged to optically amplify signals that pass through the pumped links, the resulting amplification being wavelength-dependent such that each of at least some pumped links will preferentially amplify certain wavelength channels;
    e) the pumped links are arranged to at least partially offset, by amplification, cumulative optical losses sustained in transit between the hub and respective nodes on said paths, wherein signals in channels directed along some paths will suffer higher such losses than signals in some other channels and will correspondingly receive higher cumulative amplification than signals in said other channels;
    (f) there are at least three classes of path distinguished by the number of pumped links included in a path, such that on at least some paths certain wavelength channels may undergo repeated amplification by passing through multiple pumped links; and
    (g) the nodal wavelength assignment is made such that both said preferential amplification of certain wavelength channels and said repeated amplification of certain wavelength channels are used to provide said higher cumulative amplification to at least some wavelength channels that suffer said higher cumulative losses.

2. The optical communication network of claim 1, wherein at least one pumped link is arranged to serve as a distributed gain optical amplifier.

3. The optical communication network of claim 1, wherein at least one pumped link is arranged to serve as a distributed gain Raman amplifier.

4. An optical communication network comprising at least one unidirectional wavelength-division multiplexed (WDM) ring that interconnects a hub and a plurality of nodes, wherein:

a) a distinct wavelength channel is assigned to each node for communication along the ring from the hub to such node and from such node to the hub;

b) each adjacent pair of nodes, and likewise each pair consisting of the hub and an adjacent node, is connected by a link of the WDM ring;

c) Raman pump sources are directly coupled to at least two links, to be referred to as pumped links, such that distributed Raman amplification in the pumped links will provide all of the amplification needed to offset cumulative optical losses sustained in transit between the hub and respective nodes; and d) at least two pumped links are pumped at different pump wavelengths and preferentially amplify different wavelength channels.

5. The optical communication network of claim 4, wherein at least one link of the WDM ring is not a pumped link.

* * * * *